United States Patent [19]

Kyle et al.

[11] Patent Number: 4,609,514
[45] Date of Patent: Sep. 2, 1986

[54] PROCESS FOR PRODUCING DECORATIVE COVERINGS FOR SUBSTRATES

[75] Inventors: Robert L. Kyle; Donald R. Cardis, both of Munroe Falls, Ohio

[73] Assignee: Schneller, Inc., Kent, Ohio

[21] Appl. No.: 525,376

[22] Filed: Aug. 22, 1983

[51] Int. Cl.⁴ ............................................. B29C 59/04
[52] U.S. Cl. .................................. 264/153; 264/163; 264/284; 425/3; 425/385; 425/DIG. 48
[58] Field of Search ............... 264/284, 290.2, 153, 264/163; 425/3, DIG. 48, 385

[56] References Cited

U.S. PATENT DOCUMENTS

| | | | |
|---|---|---|---|
| 2,609,568 | 9/1952 | Getchell | 425/385 |
| 2,928,124 | 3/1960 | Hugger | 264/284 |
| 3,131,425 | 5/1964 | Jacobs et al. | 264/284 |
| 3,176,058 | 3/1965 | Mittman | 264/284 |
| 3,217,361 | 11/1965 | Ryan et al. | 425/3 |
| 3,556,000 | 1/1971 | Goodwin | 425/3 |
| 3,810,729 | 5/1974 | Patchell | 264/284 |
| 3,849,050 | 11/1974 | Adams et al. | 264/284 |
| 3,857,144 | 12/1974 | Bustin | 264/284 |
| 4,158,070 | 6/1979 | Lewicki, Jr. | 264/284 |
| 4,259,285 | 3/1981 | Baumgartl et al. | 264/284 |
| 4,352,771 | 10/1982 | Szabo | 264/284 |
| 4,426,343 | 1/1984 | Vittone et al. | 264/290.2 |

FOREIGN PATENT DOCUMENTS

1055428 2/1954 France .................. 264/284

Primary Examiner—James Lowe
Attorney, Agent, or Firm—Oldham, Oldham & Weber

[57] ABSTRACT

Methods and apparatus are provided for permanently and rapidly imparting surface characteristics, such as texture or graining, to decorative coverings for substrates, such as wall coverings in the absence of any degradation thereof, so that when the coverings are subsequently applied to the substrate, such as an aircraft bulkhead, by heat application, the texture previously imparted will remain intact. The process and apparatus uses magnetic attraction in tenter frames to carry and expose continuous webs of thermoplastic to high temperature embossing with simultaneous and subsequent rapid cooling. The arrangements and process avoid lengthy press application at high temperature which has the effect of degrading color and other characteristics of the material being treated.

8 Claims, 8 Drawing Figures

PROCESS FOR PRODUCING DECORATIVE COVERINGS FOR SUBSTRATES

BACKGROUND AND STATEMENT OF THE INVENTION

This invention relates generally to the heat treatment of surface coverings such as wall coverings in order to impart certain characteristics to those surface coverings. More particularly, this invention relates to processes and apparatus for the rapid heat treatment of surface coverings in order to impart a texture or grain which may be either decorative, or serve some useful, practical purpose for the surface, when it is subsequently applied to a substrate.

Various kinds of thermoplastic sheet materials, which may be treated by heat applications, are used in large quantities today as wall coverings or surface coverings of some kind in order to impart to a substrate a particular color or texture. This is true of the individual panels forming the internal walls of aircraft cabins, for example, and the bulkheads thereof. That is, commercial airlines require that the interior surfaces of their particular aircraft have imparted thereto particular proprietary characteristics designating that airline. For example, the color may be selected to designate the airline, and the bulkheads arranged at the front of each aircraft cabin may have certain design characteristics or logos. In addition, private aircraft may have certain design characteristics as requested and/or desired by an individual owner in order to decorate a cabin for his or her specific purposes.

Thus, when aircraft are built and the substrate sections for forming the walls of the aircraft are formed, they are subsequently covered with coverings which impart certain appearance characteristics and/or textures to the overall appearance of the cabin once the coverings are applied and the individual wall sections are in place. Generally in the past, the wall coverings have been comprised of sheets of thermoplastic materials which are placed in presses for a period of minutes in order to impart graining and/or textures to the thermoplastic sheets prior to their subsequent heat adherance to the substrate wall panels forming the aircraft cabin walls. However, pressing the individual sheets of thermoplastic material under high heat conditions for several minutes has a tendency to degrade the components forming the thermoplastic material. That is, while thermoplastics have incorporated therein a large variety of additives developed over the years in order to maintain color integrity, flame retardancy, pliability, etc., long term exposure to high temperatures has a tendency to degrade the material such as, by, degrading the color of the material.

As discussed above, customers of aircraft have certain specific and very limited desires concerning the color and/or texture of the wall coverings for use in their particular aircraft. Any degrading during the processing of the wall coverings may have a tendency to affect the color to a degree where the materials cannot be used. Moreover, pressing each individual sheet of material for a period of minutes in order to impart the desired surface texture or graining takes time and of course increases the cost of preparing the wall coverings for subsequent application to the substrate involved. Also, when the treated coverings are subsequently applied by heat to substrate panels, the heat has a tendency to reduce the degree of desired texture previously imparted to the coverings.

With this invention, by contrast, methods and apparatus are provided for permanently and rapidly imparting surface characteristics to continuous webs of thermoplastic surface covering materials to impart thereto the desired texture and/or graining required in a matter of seconds, thus reducing long term exposure of the material to high temperatures and reducing the time involved in obtaining the desired characteristics. Moreover, the process and methods herein of high temperature embossing have the effect of increasing the integrity of the surface characteristic desired for subsequent heat application to a substrate. The above is achieved by utilizing conventional tenter frame apparatus for a continuous processing at high temperatures of a continuous web of thermoplastic material for such treatment.

The tenter chain apparatus of the invention utilizes a unique magnetic application in that one set of tentor chains carries individual magnets in each section thereof while the opposing chain is utilized to attract the magnets. Thus, the magnetic attraction serves to provide a continuous gripping of the web edges of a continuous thermoplastic sheet, which, therefore, may be carried through a processing apparatus. By doing so, the thermoplastic material is not exposed to any tearing from pin holes or clamps of any kind ordinarily associated with tenter frames.

The arrangement is such that the continuous web of material may pass through high temperature radiant heaters for imparting a high temperature level rapidly to the web of material which is, subsequently, simultaneously rapidly cooled while being passed over an embossing roll immediately after the application of heat. Subsequent to the cooling-embossing application, the continuous sheet of material passes over a cooling can which rapidly brings the embossed and/or textured and/or treated continuous web of material to ambient so as to fix the desired characteristic. Subsequent to the cooling, of course, the product is wound up for delivery for subsequent application of the covering material to a substrate.

Because of the rapid nature of the process and apparatus, in accordance herewith, the thermoplastic material is exposed to high temperatures for only three or four seconds. This reduces to a minimum any degradation of additives in the thermoplastic material including those for color, and/or flame retardancy and/or flexibility. Moreover, because of the high temperature rapid application of texture or graining to the thermoplastic material, the integrity thereof is maintained to a higher degree than is the case when such thermoplastic material has such texture or graining imparted in a press over a period of time of several minutes. With such long term exposure, lower temperatures must be used to avoid degrading the additives imparted to the thermoplastic formulation in the first place.

With the foregoing and additional objects in view, this invention will now be described in more detail, and other objects and advantages thereof will be apparent from the following description, the accompanying drawings, and the appended claims.

Before describing this invention in more detail, it may be well to note that a variety of thermoplastic materials may be utilized with the process and apparatus herein, including, for example, polyvinylfluoride, such as TEDLAR, a product of DuPont, polyvinyl chloride such as VHI Films, a product of General Tire Company which is a very high impact polyvinyl chloride film, polyvinyl chloride coated fabrics, acrylonitrile-butadiene-styrene terpolymer films, and combinations of the above.

As purely illustrative of apparatus which may be used for carrying out the process of this invention, one may note the attached drawings in which conventional tenter frame apparatus has been modified according to this invention to provide the new processing characteristics and conditions for this invention, including the utilization of magnetic attraction in tenter frames together with the positioning of specific radiant heater apparatus, and an arrangement for removing the margins or edges of the continuous web of material being processed, which margins or edges were utilized to maintain the continuous sheet or web and carry it through the apparatus to the point of the embossing rolls. At this point, the edges or margins are slit from the continuous web of material which passes around the embossing roll. Thus, once the magnetic attraction of the tenter chains leave the material being treated, the edge margins, which were held by the tenter chains are also removed at the same time.

DETAILED DESCRIPTION OF THE INVENTION

Figure 1:
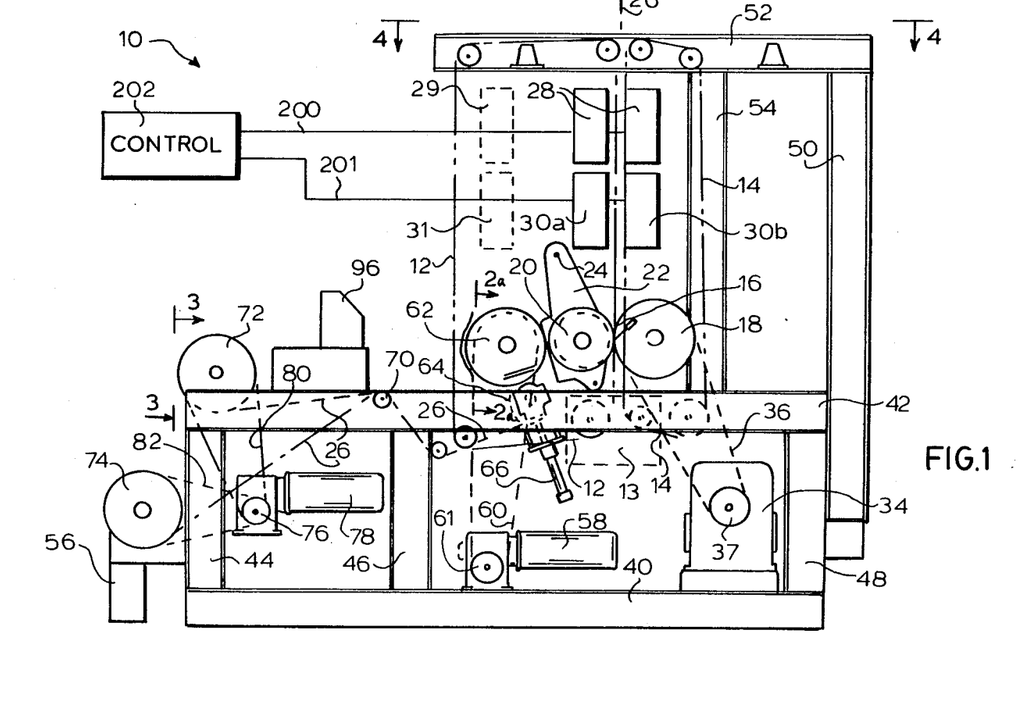
FIG. 1 is a somewhat diagramatic side elevational view of apparatus illustrating the invention.

Referring to the drawings in which like reference characters refer to like parts throughout the several views thereof, FIG. 1 shows apparatus for carrying out the process of the invention generally designated 10, which apparatus carries a front tenter chain 12 and an opposed rear tenter chain 14. As will be understood by practitioners-in-the-art the view shown in FIG. 1 is one side view of the apparatus, and duplicate tenter chains, pulleys, etc. are also arranged at the opposite side of the apparatus.

As will be discussed in more detail below, rear chain 14 at each end of the apparatus frame carries a series of magnets which attract the metal components of the front chain 12 for holding a continuous web 26 of material for passing through a pressure nip 16 formed between an embossing roll 20, and a rubber back-up roll 18. The embossing roll pressure against back-up roll 18 is controlled by movement of the embossing roll around pivot 23 on crank arm 22. The pressure in nip 16 may be controlled, as desired, by pressure placed on embossing roll 20 with this arrangement, as will be described in more detail below.

As can be seen in FIG. 1, back-up roll 18 is driven by drive chain 36 from a motor 34 with a sprocket 37 thereon, with drive chain 36 passing around sprocket 37 to a sprocket on roll 18. Motor 34 is supported on base frame 40 with an upper frame 42 supported by vertical uprights 44, 46 and 48 extending therebetween. In describing this arrangement, it will be understood, by practitioners-in-the-art, that the frames just described describe only one end of the apparatus and that further duplicate frame structure is arranged at the opposite end of the apparatus. Thus, upright 48 has welded thereto an upright 50, and an upright 54 for supporting an upper beam 52, which, as will be understood, supports at each side edge of the apparatus, sprocket wheels for carrying the tenter chain apparatus.

Disposed in the path of the continuous web 26 are a pair of upper radiant heaters 28 and a lower front radiant heater 30a, and rear radiant heater 30b. These heaters serve to impart rapidly the desired temperature level to the product prior to the product passing into the nip between the embossing roll 20 and the back-up roll 18. The heaters are arranged to bring the temperature of the continuous web 26 of material being treated up to the desired temperature when it reaches pressure nip 16. Thus, the upper heaters 28 impart a pre-embossing temperature at a lower level, while front lower heater 30a imparts a high level temperature to the front face of web 26 to be embossed, and simultaneously lower rear heater 30b imparts a higher temperature than the level of heaters 28 but to a lower degree than front lower heater 30a. For example, and as representative or illustrative only, in treating TEDLAR, for example, heaters 28 may be maintained at 800° F. while heaters 30a may be maintained at 1100° F., and rear lower heater 30b at 900° F. With such a temperature arrangement, a TEDLAR web 26 will have a temperature of about 400° F. when it enters nip 16. The settings of heaters 28, 30 are controlled through lines 200, 201 by control 202.

Arranged immediately adjacent to the embossing roll 20 is a cool down roll 62 which may have water continuously passing through it as does embossing roll 20 for reducing, rapidly, the temperature of the material passing over the rolls during and after it has been embossed by roll 20. Once the product passes over and around cooling roll 62, it is controlled in the take off thereof by a pressure roll 64 under the action of a reversible pressure cylinder 66. This has the effect of accommodating variations in the length of the product web in its cool down stage, prior to the take off thereof to the wind-up area.

Thus, as shown in FIG. 1, the product passes around pressure roll 64, guide roll 68 and 70 where the product may be fed either to a wind-up roll 72 or a wind-up roll 74. Wind up rolls 72 and 74 are driven by drive motor 78 driving a sprocket wheel 76 which carries drive chain 80 going to wind-up roll 72, and drive chain 82 to wind-up roll 74. As can be seen further in FIG. 1, drive motor 58 carries sprocket 61 for driving, through chain 60, cooling roll 62. The tenter chains 12, 14 are driven by a separate motor 13 positioned centrally in the apparatus in a conventional manner. The arrangement is not shown for clarity.

Figure 1A:
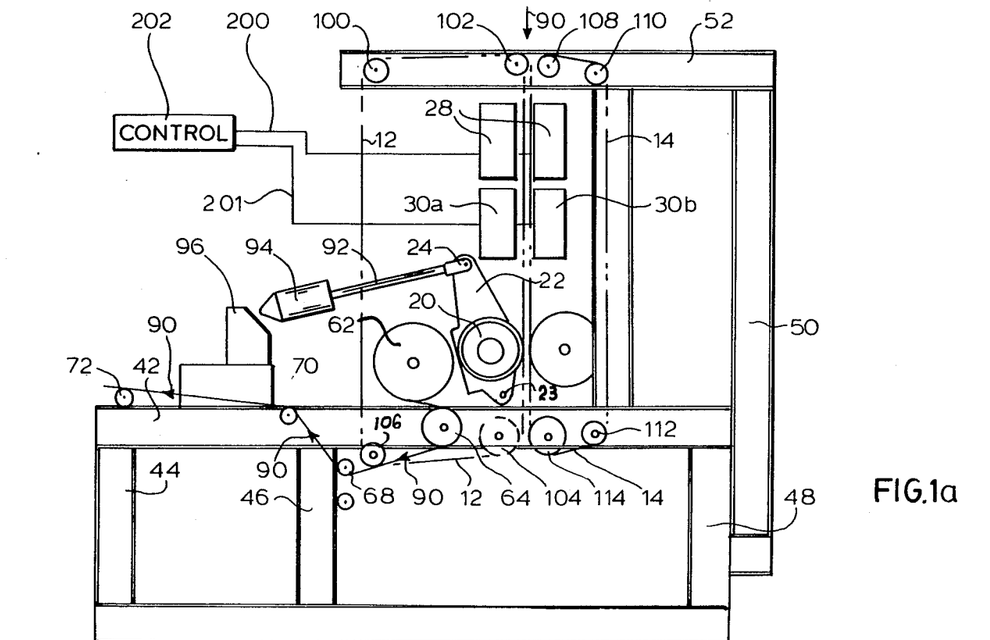
FIG. 1a is a more stylized diagramatic side elevational view similar to that of FIG. 1, with parts removed for clarity in order to illustrate the path of movement of the material being processed through the apparatus of the invention.

Referring now to FIG. 1a, which is a diagramatic illustration of the apparatus shown in FIG. 1 with certain parts removed for clarity, it will be seen that the movement of crank 22 for controlling the pressure nip 16 between embossing roll 20 and back-up roll 18 is through a reversible pressure cylinder 94 pivotally mounted on support 96 which in turn is mounted on frame 42. The rod 92 of pressure cylinder 94 extends to the connection 24 on crank arm 22 for the controlled movement of the embossing roll 20 around pivot 23.

Tenter chain 14 as shown in FIG. 1a passes around lower sprockets 112, 114 and upper sprockets 108, 110. Tenter chain 12, on the other hand, passes around lower sprockets 104, 106 and upper sprockets 100, 102. The passage of the product web through the apparatus is shown by the series of arrows 90 in FIG. 1a. Thus, the product web passes through a vertical path defined by the heaters 28, 30, followed by the embossing nip 16 formed by rolls 18, 20 whereupon after passing over embossing roll 20 the product is further cooled by passing over cooling can or roll 62. The "play" of the web by the effect of the cooling while passing over can 62 is controlled by pressure roll 64. After passing around pressure roll 64, the product passes around rollers 68 and 70 where the product passes to either one of the wind-up rolls 72 or 74.

The embossing roll 20 may be exchanged for another in order to provide a variety of different characteristics, as desired. Thus, to that end, front heaters 28, 30a, may be moved to the dotted line positions 29, 31, as shown in FIG. 1, so that the embossing roll 20 may be lifted out of its position for replacement with a different roll having different surface characteristics for imparting different characteristics to a product passing through the nip 16.

Figure 2:
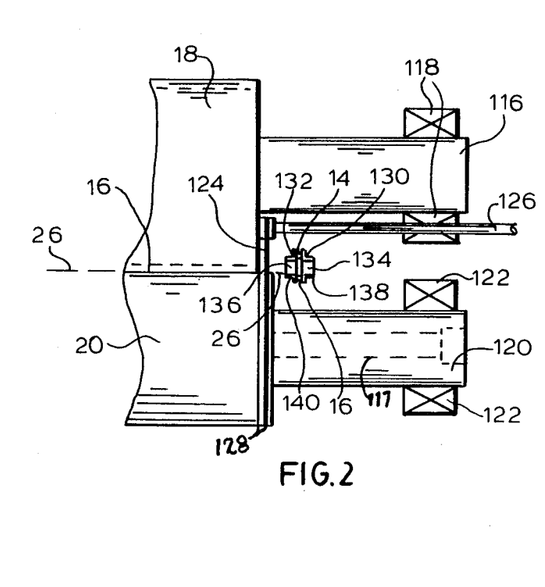
FIG. 2 is a partial top plan view of the embossing nip of the apparatus of the invention showing the arrangement of slitter for slitting the marginal edges of the continuous web or sheet of material being treated or processed and the arrangement of magnets carried by one tenter chain and the opposed tenter chain acting to attract the tenter chain carrying the magnets.

Referring now to FIG. 2, a partial top plan view is shown of nip 16 with product web 26 shown passing through nip 16. The position of the slitter knife 124 at one end of the web 26 is shown. That is, the knife 124 is mounted on a rod 126. The knife, as will be understood, is a razor-type slitting knife for slitting off the marginal edges of web 26 once it passes through nip 16. The cutting edge of knife 124 cooperates, in this connection, with a groove 128 for insuring a clean cut of the marginal edge of the web 26.

As can be seen in FIG. 2, further, the shaft 116 of roll 18 is supported in bearings 118 while the shaft 120 for the embossing roll 20 is supported in bearings 122. As will be understood, shaft 116 passes through the apparatus and is supported on the opposite end thereof with another set of bearings as does shaft 120. Shaft 120 includes a passage 117 for directing cooling water to roll 20.

Also shown in FIG. 2, is the arrangement of opposed tenter chains 14, 12. That is, the arrangement shown in FIG. 2 is a top plan view of a section through the chain arrangement. Thus, chain 14 has opposed L-shaped brackets 130, 132 with brackets 130 carrying magnet 134 and bracket 132 carrying magnet 136. Magnet 134 is attracted by the metallic L-shaped bracket 138 carried by opposed tenter chain 12 while magnet 136 is attracted by metallic L-shaped bracket 140 carried by tenter chain 12. Thus, the marginal edges of product web 26 are held between the opposed tenter chains by magnetic attraction until the marginal edges are slit by knives 124 at each end of the nip 16. The slit marginal edges of the web 26 fall to the floor into a collection bin.

Figure 2A:
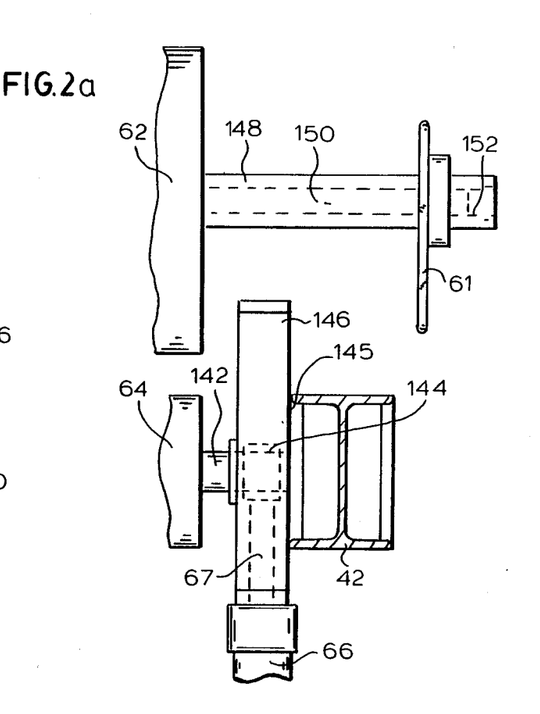
FIG. 2a is a partial view in elevation taken along lines 2a—2a of FIG. 1.

FIG. 2a shows the support for the cooperating arrangement between the pressure roll 64 and cooling roll 62. Thus, frame 42 carries by welds 145 a housing 146. The support shaft 142 for roll 64 extends into housing 146 where it is held by a bracket 144. Bracket 144 may be moved under the action of the pressure cylinder 66. The rod 67 therefore is connected to the bracket 144 for moving shaft 142 in adjustments, as will be understood, of roll 64 against cooling can or roll 62.

Cooling can 62 is driven by a sprocket 61 over which drive chain 60 passes from drive motor 58 (FIG. 1). Sprocket 61 drives shaft 148 for rotating cooling can 62. Shaft 148 carries a passage 150 with a nozzle 152 at the end thereof for directing cooling water internally of cooling can 62.

Figure 4:
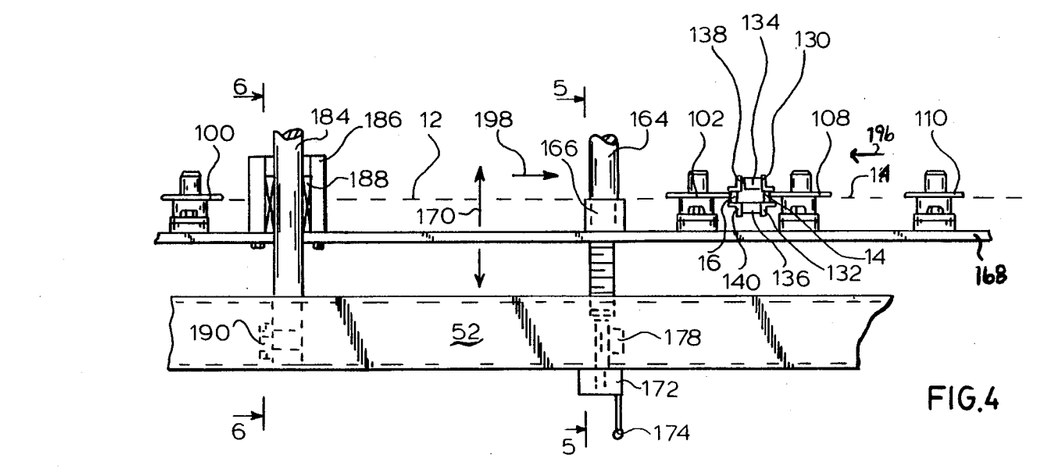
FIG. 4 is a partial top plan view taken along lines 4—4 of FIG. 1, and illustrating the top supporting and adjusting apparatus of the tenter frames of the invention.

Referring now to FIG. 4, a partial top plan view of one end of the support structure for the tenter frames is shown. Thus, tenter chain 14 moves in the direction of arrow 196 over sprockets 108, 110, which sprockets are supported on a plate 168. Chain 12 moves in the direction of arrow 198 as shown in FIG. 4 over sprockets 100, 102. Support shaft 184 extends from a support bracket 190 positioned on an upper supporting beam 52 at opposite ends of the apparatus. Shaft 184 supports, in connection with linear bearing housing 186, plate 168 for relative movement therebetween, as indicated by arrows 170 in FIG. 4. Shaft 184, as shown in FIG. 4 is supported in bearing housing 186 by bearings 188.

Figure 6:
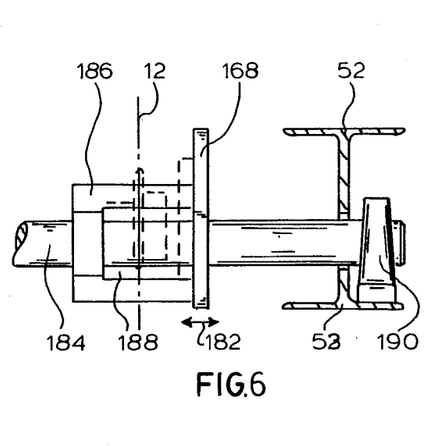
FIG. 6 is a partial sectional view taken along lines 6—6 of FIG. 4.

The arrangement of the support of shaft 184 is shown in detail in the partial sectional view of FIG. 6. Thus, it can be seen that support bracket 190 for shaft 184 is positioned on the lower flange 53 of I beam 52 for supporting shaft 184 and its associated plate 168. As can be seen further in FIG. 6, plate 168 is adjustable in the direction of the arrow 182. The adjustment of plate 168 is such as to vary slightly and control the width of the product web through the vertical orientation thereof along the heaters to the pressure nip. By "spreading" so to speak, the tenter chain frames at the upper end thereof slightly, adjustments may be made to accommodate the oriented nature of some of the thermoplastic continuous sheet material being processed, in accordance herewith.

Figure 5:
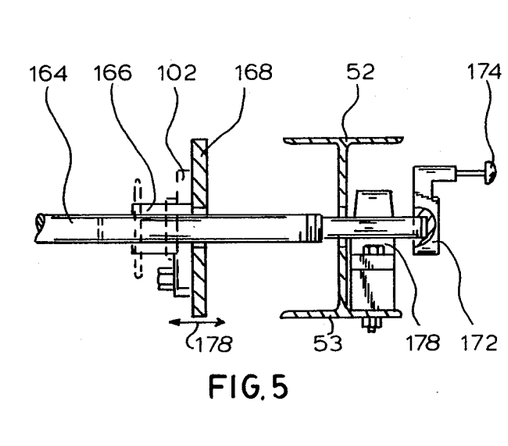
FIG. 5 is a partial sectional view taken along lines 5—5 of FIG. 4.

Referring further in FIG. 4, it can be seen that adjacent sprocket 102 is an adjusting shaft 164 also supported at one end thereof on a bracket positioned on the lower flange 53 of I beam 52. Shaft 164 is supported in a pillow bearing housing 178. Shaft 164 may be, for example, an Acme screw shaft for cooperating with nut 166 fixed on frame 168 for the adjustable movement of frame 168 in the directions of arrow 178, as shown in FIG. 5. Positioned on one end of shaft 164 is an adjustment bracket 172 operated by a hand crank 174 for rotating shaft 164 for moving frame 168, as required. It will be understood, that movement of the frame 168 in the directions shown by arrows 170 has the effect of moving all of the upper supporting sprockets 100, 102, 108, 110 in either direction as indicated by arrows 170. This has the effect of providing a slightly wider or slightly narrower product web through the heaters to the tenter chain nip for embossing the product web. The arrangement of the adjustment of rod 164 may be seen in a partial sectional view shown in FIG. 5.

Figure 3:
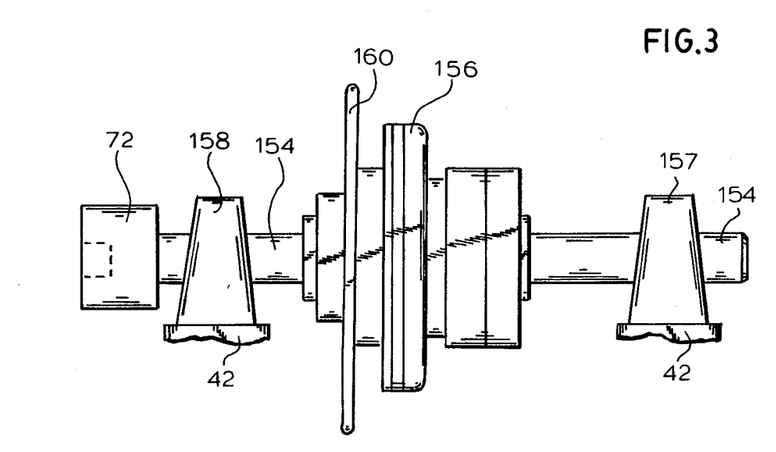
FIG. 3 is a view in elevation taken along lines 3—3 of FIG. 1 and illustrating an arrangement of wind-up roll assembly for the apparatus of the invention.

With respect to the wind-up of the product, once it passes over the cooling can or roll 62, the product is collected on a wind-up roll 72 or 74. The wind-up roll 72, as shown in FIG. 3, is supported on shaft 154 which in turn is supported on spaced brackets 157, 158 mounted on frame 42, as shown in FIG. 3. The drive chain 80 from drive motor 78 (FIG. 1) for roll 72 passes over a sprocket 160 mounted on shaft 154. Also mounted on shaft 154 is an air clutch 156 which serves to control the wind-up operation to accommodate variations in the product web as it comes from the cooling can.

Accordingly, and as will be apparent from the foregoing, there are provided in accordance with this invention, methods and apparatus for the rapid heat treatment of a continuously moving web of covering for substrates, which web may have imparted to it a wide variety of different appearance characteristics or textures, as required. The process and apparatus herein iimpart the desired characteristics in a very rapid manner so as to avoid degradation of the material for its subsequent use. Moreover, the procedure is such that the characteristic imparted in the form of a texture or grain, for example, is much more stabilized than is the case with prior art procedures wherein the arrangement for imparting takes much longer in exposing the web being treated because lower temperature conditions must be used. As will be understood, because of the rapid treatment procedures, in accordance herewith, the invention here is particularly appropriate for a variety of production techniques wherein rapid mass production procedures may be utilized.

While the methods and apparatus herein disclosed form preferred embodiments of this invention, this invention is not limited to those specific methods and apparatus, and changes can be made therein without departing from the scope of the invention which is defined in the appended claims.

What is claimed is:

1. A method for continuously processing a thermoplastic container web to impart surface characteristics thereto, characterized by the steps of
   (a) continuously and sequentially grasping each marginal edge of juxtaposed connection together elongated portions of said web to hold the web taut;
   (b) rapidly exposing each said grasped elongated portion to elevated temperatures by passing in a first passing step each grasped portion through a heating zone to raise the temperature of said grasped portion of said thermoplastic containing web to the melting temperature of said thermoplastic;
   (c) passing in a second passing step each grasped elongated portion from said first passing step through a cooled embossing nip having an embossing surface to impart a desired surface characteristic to that said portion of said web while simultaneously removng heat therefrom;
   (d) in said second passing step, substantially simultaneously with the passage of each said elongated portion through said embossing nip, removing each grasped side edge margin of each said elongated portion and subsequently removing each grasped edge;
   (e) maintaining the elongated portion in contact with the embossing surface for a substantial distance past the nip to effect a continued substantial cooling thereof while sustaining the desired surface characteristic;
   (f) continuously collecting each said cooled juxtaposed connected elongated portion of said web in a wind-up zone;
   wherein steps (a)–(c) are performed with the web in a vertical orientation, and moving in a downward direction.

2. The method of claim 1, further characterized by
   (a) said grasping step being carried out with opposed pairs of tenter chains at each marginal edge of said continuously moving web; and
   (b) one chain of each pair carrying magnets and the other pair carrying metal plates whereby the grasping is achieved by a magnetic attraction between the magnets and the plates.

3. The method of claim 1, further characterized by
   (a) said first passing step being carried out by passing each said grasped elongated portion through two radiant heat zones; and
   (b) the first heat zone being at the lowest elevated temperature and the last heat zone being at the highest elevated temperature.

4. The method of claim 3, further characterized by
   (a) the said thermoplastic content of said web is polyvinylfluoride;
   (b) said first heat zone is 800° F.; and
   (c) said second heat zone is 1100° F. on the embossing side of said grasped elongated portion and 900° F. on the side opposite said embossing side.

5. The method of claim 2, further characterized by
   (a) each said opposed pair of tenter chains at each side margin of said web are adjustable relative to each other to accommodate width variations in said web in said first passing step.

6. The method of claim 1, further characterized by
   (a) passing said juxtaposed connected together elongated portions forming said continuous web over a cooling roll subsequent to its contact with said embossing surface.

7. The method of claim 1, further characterized by
   (a) subsequent to its contact with said cooling roll, passing said cooled elongated portions forming said continuous web over an adjustable roll for accomodating length variations of said web prior to said wind-up zone.

8. The method of claim 1 wherein the embossing nip is defined by an embossing roll and a backup roll and wherein the backup roll has a resilient surface.

* * * * *